Inventors
Donley D. Freshwater
Raymond C. Jenness
By Robert C. Sullivan
Attorney

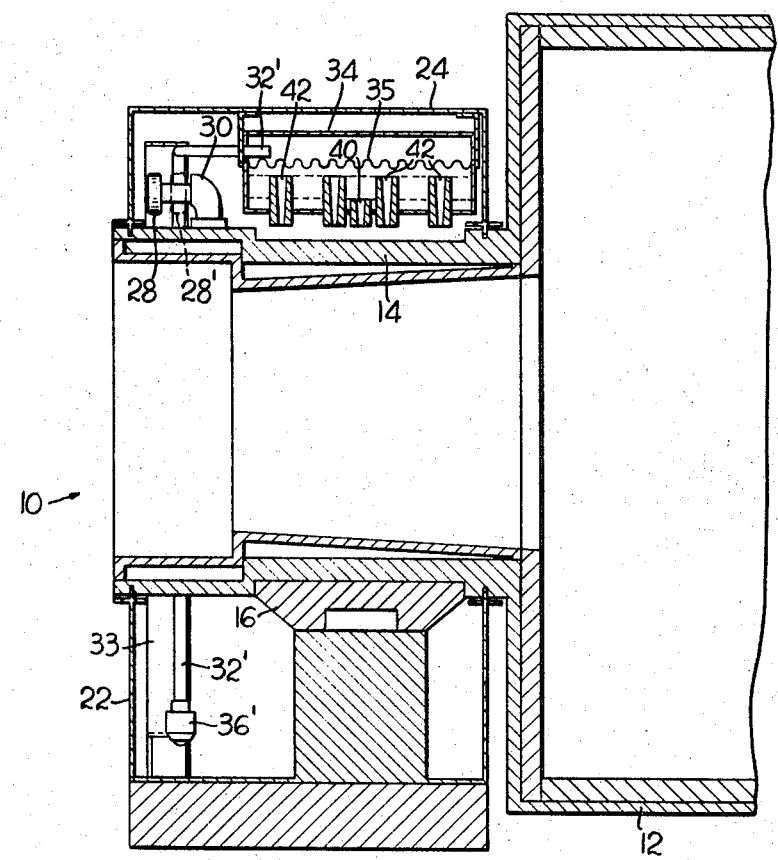
Fig. 3
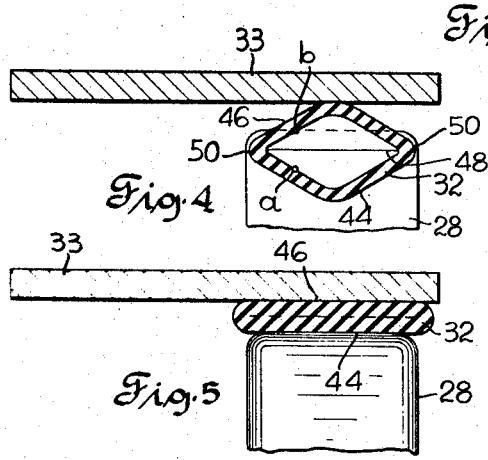
Fig. 4
Fig. 5

United States Patent Office 3,429,624
Patented Feb. 25, 1969

3,429,624
LUBRICATION APPARATUS FOR JOURNAL BEARING ASSEMBLIES AND COMBINATION OF SUCH LUBRICATION APPARATUS WITH JOURNAL BEARING ASSEMBLIES
Donley D. Freshwater and Raymond C. Jenness, Milwaukee, Wis., assignors to Allis-Chalmers Manufacturing Company, Milwaukee, Wis.
Filed Feb. 23, 1967, Ser. No. 618,161
U.S. Cl. 308—84        9 Claims
Int. Cl. F16c 1/24, 33/66, 13/02

ABSTRACT OF THE DISCLOSURE

A lubricating apparatus for journal bearings such as trunnion bearings. A pressure exerting means, preferably a roller member, is mounted on and rotates with the rotating journal or trunnion. A flexible hose is mounted adjacent the path of rotary movement of the trunnion, with the inlet end of the hose being immersed in an oil reservoir and the discharge end of the hose being located in overlying relation to the bearing assembly. Upward movement of the roller during rotation of the journal or trunnion causes the roller to compress the hose whereby to pump oil through the hose onto the bearing assembly.

BACKGROUND OF THE INVENTION

Field of the invention

This invention relates to a lubricating apparatus for journal bearings such as trunnion bearing assemblies and to the combination of such lubricating apparatus with a journal bearing assembly or the like.

Description of the prior art

Machines such as cylindrical grinding mills are supported for rotational movement by a trunnion on each end of the mill cylinder. Each trunnion is journaled in a generally semicircular bearing supported by a base. Since material to be ground in the grinding mill is often fed to or discharged from the interior of the mill through a central opening in the trunnion, the greater the capacity of the mill the larger must be the trunnion in order to provide a central opening of sufficient size to admit or discharge the desired quantity of material to or from the grinding mill.

It has been known in the prior art relating to the lubrication of trunnion bearings or the like to attach a ladle to the rotating trunnion, the ladle dipping into a reservoir beneath the bearing as the trunnion rotates, and scooping up a quantity of oil which, when the ladle reaches the upper portion of its travel, is poured into a pan mounted above the trunnion, from whence it passes onto the top surface of the trunnion. Alternatively, the oil may be poured directly from the ladle onto the trunnion. As the trunnion rotates, the oil is carried around the trunnion and between the trunnion and bearing to prevent metal-to-metal contact between the trunnion and bearing. Apparatus of the general type just described is shown in United States Patent No. 2,869,940—George O. Verch; patented Jan. 20, 1959, and assigned to the same assignee as the present application.

While lubricating apparatus of the type using a ladle as heretofore described performs satisfactorily for the lubrication of smaller size trunnion bearings, problems have arisen when the ladle type lubricating apparatus is utilized for the lubrication of larger size trunnion bearings. When using the ladle type apparatus, the increased centrifugal effect associated with the larger diameter trunnions frequently causes the lubricating oil to be discharged from the ladle before reaching the proper discharge region, the prematurely discharged oil falling back into the reservoir and thus not accomplishing any lubricating function. A further problem associated with the use of ladle type lubricating apparatus on large diameter trunnions is that splashing occurs as the trunnion-supported ladle enters the reservoir of lubricant. Additionally, the faster travel of the released lubricant will cause additional splashing. As splashing results in leakage, it is important that it be held to a minimum.

SUMMARY OF THE INVENTION

Accordingly, it is an object of this invention to provide a lubrication apparatus for rotating journals and their cooperating stationary bearings which insures that the fluid lubricant or oil is delivered to the surfaces requiring lubrication without being prematurely discharged prior to reaching the surfaces to be lubricated.

It is another object of the invention to provide a lubricating apparatus for use with journal bearings such as trunnion type bearings or the like which eliminates the undesirable splashing characteristics and associated leakage of some prior art lubricating apparatus used for this purpose.

It is a further object of the invention to provide in combination with a journal bearing assembly a lubricating apparatus which eliminates problems heretofore associated with the lubrication of such bearing assemblies, particularly trunnion bearing assemblies of larger sizes.

In achievement of these objectives, there is provided in accordance with this invention a lubrication apparatus for journal bearing assemblies and the combination of such lubrication apparatus with a journal bearing assembly, in accordance with which pressure exerting means, such as a roller member, is mounted on the rotating journal on a part thereof axially spaced from the stationary bearing and compressively engages a flexible hose stationarily mounted adjacent the rotating journal. The lower or inlet end of the hose extends into an oil reservoir and the upper end of the hose discharges onto the journal bearing assembly, whereby the engagement of the roller with the hose causes the oil to be pumped from the reservoir to the bearing assembly.

Further objects and advantages of the invention will become apparent from the following description taken in conjunction with the accompanying drawings in which:

Brief description of the drawings

FIG. 3 is a view in longitudinal vertical section, partially broken away, of the apparatus of FIG. 1;

FIG. 4 is a view in section taken along line IV—IV of FIG. 1 showing the cross section of the hose when uncompressed; and FIG. 5 is a view in section similar to FIG. 4 but showing the hose fully compressed.

Description of the preferred embodiment

Figure 1:
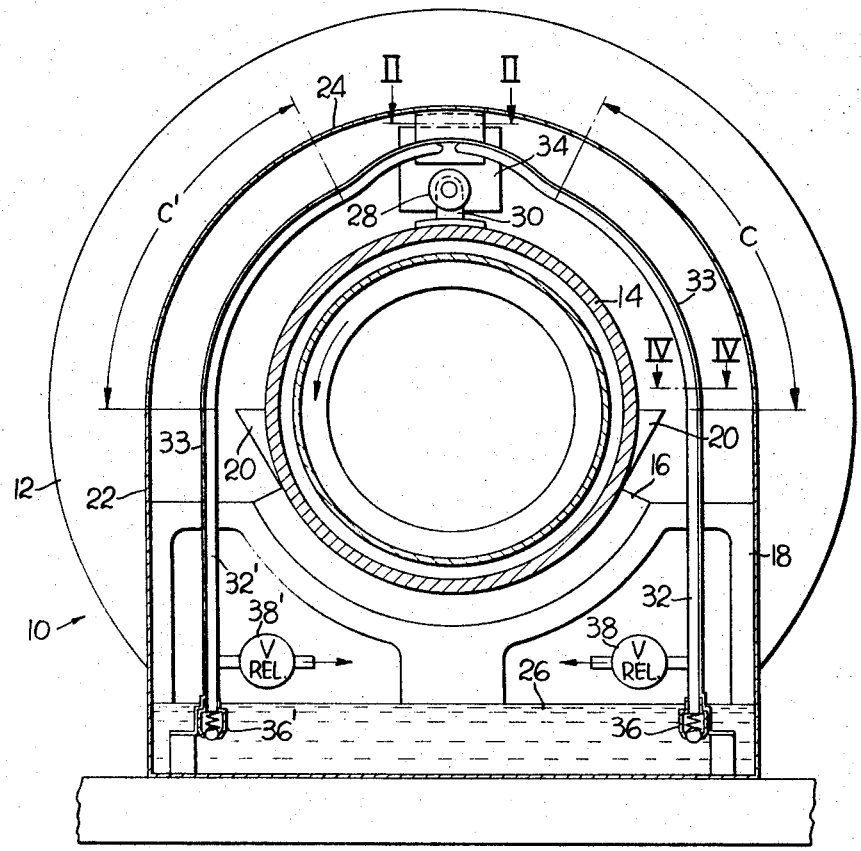
FIG. 1 is a view partially in elevation and partially in vertical section of one end of a machine, such as a cylindrical grinding mill, embodying the lubricating apparatus of the invention.

Referring now to the drawings, and more particularly to FIG. 1, there is shown a portion of one end of a machine generally indicated at 10, which may be a grinding mill, for example, including a revolvable cylinder 12 having connected thereto and being supported by a trunnion 14 which is journaled in partial or substantially semicircular bearing 16 which, in turn, is supported by a suitable pedestal-like base 18. Distributor pans 20 are suitably mounted adjacent the rotating peripheral surface of trunnion 14 to collect oil passing down the surfaces of the trunnion and to deliver the oil so collected to the bearing surfaces between the trunnion and the stationary bearing 16. A bearing protective assembly comprising the cover or housing members 22 and 24 encloses the space around the trunnion bearing assembly. A lubricating oil reservoir 26 is provided and is defined by cover member 22 and base 18.

In accordance with the invention, a roller member generally indicated at 28 is mounted on the outer periphery of trunnion 14 and is supported for rotation by a suitable bearing bracket or the like indicated at 30 which, in turn, is rigidly secured in any suitable manner to the outer surface of trunnion 14. The roller 28 and its support 30 are secured to a portion of the trunnion 14 preferably lying outboard of the bearing 16 as best seen in the view of FIG. 3, although the roller and the cooperating hose or hoses to be described could be located inboard of bearing 16.

A flexible lubricating hose or conduit generally indicated at 32 is suitably supported adjacent the upward path of rotation of roller 28 or at the right-hand side of the view of FIG. 1, with the direction of rotation of the trunnion 14 being assumed to be counterclockwise. Hose 32 is supported on the radially outer portion of its periphery by suitable stationary retaining member or frame 33 which may be supported by or form part of cover members 22 and 24. The lower end of hose 32 extends beneath the normal liquid level of oil reservoir 26, hose 32 then extending upwardly for the lower portion of its length, and then at a height substantially equal to the height of the axis of rotation of trunnion 14 begins to curve to define an arcuate path C parallel to the arcuate path defined by the outer periphery of roller 28 during the rotation of trunnion 14. At the upper end of the arcuate portion thereof, hose 30 bends away from the arcuate path of roller 28 and extends axially of trunnion 14 into an oil pan or receptacle generally indicated at 34, the details of which will be described more fully hereinafter. Hose 32 is so positioned relative to the path of rotation of roller 28 that hose 32 and roller 28 lie in a common plane transverse of the longitudinal axis of trunnion 14.

The radius from the radially outermost portion of the periphery of roller 28 to the axis of rotation of trunnion 14 and the location of hose 32 in the region of contact C between roller 28 and hose 32 are such that engagement of the roller with the hose along the arcuate path C causes the hose to be compressed substantially to the condition shown in FIG. 5 in which the interior of the hose is substantially completely closed, to provide an oil pumping action, as will be hereinafter explained. Suitable means may be provided to spring bias roller 28 into engagement with the inner periphery of hose 32.

A check valve 36 is provided at the lower end of the hose 32 to prevent reverse flow of the oil which has been trapped in the hose. A relief valve 38 is also provided in the lower portion of the hose adjacent reservoir 26 to permit discharge of the oil from hose 32 in case oil pressure within the hose 32 exceeds a predetermined safe limit. This relief valve is provided to prevent danger of hose 32 splitting due to excessive pressures therein. Relief valve 36 relieves excessive pressure in hose 32 which might be caused, for example, by clockwise rotation of trunnion 14, with respect to the view of FIG. 1, since such clockwise rotation would cause a pumping action in the downward or reverse direction by roller 28 on hose 32. Such reverse pumping action may occur in the case of grinding mills which normally rotate only in a single direction since on shutdown of such mills the cylinders of such mills usually oscillate in pendulum-like fashion for a short time after shutdown.

If it is known that during normal operation trunnion 14 will always be rotating in the same direction as, for example, in the counterclockwise direction indicated in the view of FIG. 1, then only a single hose or conduit 32 need be provided, since the pumping action provided by the engagement of roller 28 with hose 32 occurs only during the upward portion of the travel of roller 28 during counterclockwise rotation of trunnion 14. If trunnion 14 and the drum to which it is attached may during the operation thereof be rotated in either a clockwise or a counterclockwise direction, then it is necessary to provide a second hose or conduit generally indicated at 32' which is generally similar to the hose 32 in that it extends upwardly from beneath the liquid oil level in reservoir 26 to a height substantially equal to the height of the axis of rotation of the trunnion and then curves to lie for a portion of its length along an arc C' parallel to the path of arcuate rotation of trunnion 14, with the upper end of the hose 32' being bent so that it discharges into oil pan 34.

Hose 32' is provided with a check valve 36' and a relief valve 38'.

If it is known that the machine will be operated only in a clockwise direction, then only the hose 32' need be provided.

Figure 2:
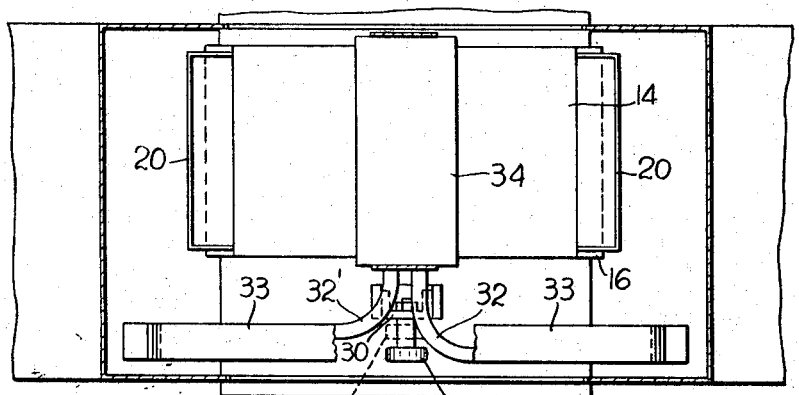
FIG. 2 is a view taken along line II—II of FIG. 1.

If a hose 32' is provided, when it is desired to operate the machine in a clockwise direction, roller 28 is moved to the position indicated at 28' (FIGS. 2 and 3), as by suitably shifting bracket 30, so that in its shifted position the roller lies in a common plane with the arcuately extending portion C' of hose 32' and in a plane axially offset from the plane of hose 32.

In its shifted position 28', the roller 28 on the clockwise rotation of trunnion 14 will contact only hose 32' and will not contact hose 32.

As a practical matter, in the case of a machine such as a grinding mill, the mill might be operated for a period of months in one direction, and then operated for another period of months in the reverse direction.

During the counterclockwise periods of rotation of trunnion 14, a pumping action will be provided by engagement of roller 28 during the upward travel thereof with the hose 32 in the arcuate roller-hose contact zone C, while during the counterclockwise downward travel of roller 28, it does not engage hose 32', since roller 28 in its full line position is so positioned as to be axially offset from hose 32'. Conversely, when trunnion 14 is operating in a clockwise direction of rotation, roller 28 in its dotted line position 28' will compressively engage hose 32' to cause a pumping of lubricating oil from the reservoir to the discharge point during the portion of the rotation of the trunnion when roller 28 in position 28' is moving in an upward clockwise direction and in the roller-hose contact zone C'. While the roller in position 28' is moving in a downward direction during such clockwise rotation, it will not engage hose 32 since the roller in position 28' is located in a plane offset from the plane of hose 32.

As best seen in the view of FIG. 5, the oil pan 34 into which the lubricating oil is discharged by the hoses 32 and/or 32', is positioned in overlying relation to the upwardly open surface of trunnion 14 and is suitably supported by the cover or housing member 24. A screen 35 of a suitable mesh is positioned in oil pan 34 below the level at which hoses 32 and 32' discharge into the oil pan, for the purpose of filtering out any foreign matter in the oil. In the illustrated embodiment as seen in FIG. 5, the oil pan 34 is provided with at least one low level orifice 40 whose inlet opening projects only a short distance, such as one-half inch, for example, above the bottom surface of oil pan 34. A plurality of high level outlet openings or orifices 42 project upwardly into the interior of the oil pan. The inlet openings to orifices 42 may be, for example, at a level two or three inches above the inside bottom surface of oil pan 34 and determine the normal operating level of oil in oil pan 34. The low level orifice 40 insures that even if the oil should drop to a low level in the oil pan 34, there will still be some lubricant passing to the surface of the trunnion bearing assembly through the orifice or orifices 40. However, normally, the various components of the lubrication apparatus, such as the number of rollers 28, the size of hoses 32 or 32', and the size of the orifices 40 and 42 would be such that a normal operating oil level would be maintained at a height corresponding to the inlet openings to high level orifices 42.

Hoses 32 and 32' preferably have a cross-sectional shape similar to that disclosed in United States Patent No. 3,192,863, issued to Louis Vadot on July 6, 1965. As seen in FIG. 4, in the normal uncompressed condition of hose 32, it has in cross section a shape somewhat resembling the section of a fruit pit. The outer wall 44 and the inner wall 46 of hose 32 generally have a generally similar shape whose configuration may be approximately defined by two opposite and intersecting circular arcs having a common chord 48 which is parallel to the axis of the roller 28. The longitudinal edge portions of the outer wall 44 and of the inner wall 46 of the hose 32 are disposed at an acute angle to each other and the junctures thereof form the longitudinal side edges 50 of hose 32. FIG. 5 shows how the cross-sectional area of a transverse portion of the hose 32 is compressed by the engagement of roller 28 therewith. As the roller approaches such transverse portion, the walls 44 and 46 of the hose become flattened in such a manner that all points symmetrically opposite in substantially the entire areas of the inner surfaces of such walls, such as the points designated $a$, $b$, on the inner surfaces of the walls 44, 46, respectively, will move toward each other. When the roller directly radially engages such transverse portion and entirely flattens the same against the inner face of the support frame 33 for the hose, all of such symmetrically opposite points across the transverse width of such inner wall surfaces will meet and the hose will be completely closed throughout the entire cross-sectional extent thereof where directly radially engaged by the roller, as best seen in FIG. 5.

It is believed the operation of the lubricating apparatus will be obvious from the foregoing description. However, a brief summary of operation will be given.

In first starting up the machine 10 having trunnion 14 thereon, it may be necessary or desirable to manually fill oil pan 34 with oil to the maximum oil level defined by the upper ends of outlet orifices 42. Assume that the machine and the trunnion 14 are operated in a counterclockwise direction with respect to the view shown in FIG. 1. As trunnion 14 rotates, roller 28 in its full line position on the upward portion of its travel in the counterclockwise direction of rotation with respect to the view of FIG. 1 will compressively engage hose 32 along the portion of the periphery of the hose which lies along the arcuate path C (FIG. 1) parallel to the arcuate path of movement of the roller 28; namely, that portion of the hose 32 periphery beginning at the level of the axis of the trunnion 14 where contact between roller 28 and hose 32 first occurs, to a point where the hose bends away from its circular arc to enter oil pan 34.

Assume that on the first initial contact of roller 28 with hose 32 that the hose 32 has only air and no oil therein. In such case, the progressive contact of the roller with successive portions of the hose cross section in the upward movement of roller 28 in effect progressively lengthens the column of air in hose 32 below roller 28 to produce a suction effect which draws oil from the oil reservoir up into the lower portion of hose 32. On the first rotation, or first several rotations of trunnion 14 in first starting up, the engagement of roller 28 with the hose 32 may only be effecive to partially fill hose 32 with the lubricating oil, but as the trunnion continues to rotate, the oil level in hose 32 will gradually be raised to a level such that the further engagement of roller 28 with the hose 32 will elevate the oil sufficiently to cause a discharge of the oil through the discharge orifice of hose 32 and into oil pan 34. As previously explained, if a hose 32' is provided, the downward rotation of roller 28 in its full line position past the hose 32' will be ineffective to exert any pressure on hose 32' due to the fact that the path of movement of roller 28 in its full line position is in a plane offset from the plane in which hose 32' is positioned.

If the machine 10 and trunnion 14 are to be rotated in a clockwise direction, hose 32' is provided and roller 28 is moved to the dotted position 28' in which it engages hose 32' on its upward movement through arcuate path C' to provide a pumping action on the oil in the same manner as just described in connection with roller 28 in its full line position and hose 32.

During the rotation of machine 10 and trunnion 14 in either direction of rotation, oil will be discharged from the hose 32 in the case of counterclockwise rotation and from hose 32' in the case of clockwise rotation into the oil pan 34 from whence it will be discharged through the low level orifice 40 and through the high level orifices 42 onto the surface of the trunnion. As the trunnion rotates, the oil will be carried by the rotating trunnion to the bearing surfaces between the trunnion 14 and the bearing 16. Oil will also be collected by the distributor pans 20 and delivered to the facing bearing surfaces of trunnion 14 and bearing 16.

The relief valves 38 and 38' in the respective hoses 32 and 32' provide relief for any excessive pressure which might be developed, as for example, during the shutdown operation when the machine 10 is a grinding mill, since grinding mills upon shutdown thereof tend to oscillate in a pendulum-like manner for a short time after shutdown. The relief valves 38 and 38' would relieve any excessive pressures developed in the hoses 32 and 32' during such oscillating movement of the grinding mill.

While only a single roller 28 has been provided to effect a pumping action in either direction of rotation, obviously a plurality of rollers 28 could be mounted at peripherally spaced points about trunnion 14 to engage the respective hoses 32 or 32' to provide a greater pumping action, if required.

A float switch or other device responsive to the level of oil in oil pan 34 may be provided, and be connected in a suitable control circuit to shut down the machine if the oil level in pan 34 drops below a predetermined safe level.

It can be seen from the foregoing that there is provided in accordance with this invention an improved lubricating apparatus for use with journal bearing assemblies, such as trunnion bearing assemblies. The lubricating apparatus of the invention, and the combination thereof with such machines, provides an improved arrangement for the distribution of the lubricant to the bearing surfaces of the journal or trunnion and its supporting bearing which insures that the oil is delivered to the proper discharge point for the oil, in contrast to prior arrangements such as the ladle type lubrication systems of the prior art in which the centrifugal force of the rotating trunnion, particularly in large diameter trunnions, frequently causes the oil to be discharged from the ladle before it reaches the proper point of discharge. The cooperating roller and hose assembly hereinbefore described also eliminates splashing of the lubricant and the associated leakage thereof which is frequently a problem of the prior art lubrication arrangements for trunnion type bearing assemblies, particularly with larger diameter trunnions.

From the foregoing detailed description of the present invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. In combination, a journal bearing assembly comprising a rotatable journal, said journal having a hollow passage therethrough and being open at the axially outer end of said hollow passage, a bearing for said journal, a portion of said journal being in axially spaced relation to said bearing, pressure exerting means mounted on said portion of said journal and rotatable with said journal, a flexible conduit stationarily mounted adjacent the path of rotation of said pressure exerting means, and so positioned that said pressure exerting means during its rotation compressively engages said conduit, a reservoir for fluid lubricant positioned beneath said journal bearing assembly, said conduit including an inlet in communication with said reservoir and a discharge outlet positioned contiguous said journal bearing assembly, whereby compressive engagement of said pressure exerting means with said conduit provides a pumping action which pumps fluid lubricant through said conduit to said bearing assembly.

2. The combination defined in claim 1 in which said pressure exerting means is a roller.

3. In combination, a journal bearing assembly comprising a rotatable journal, a bearing for said journal, a portion of said journal being in axially spaced relation to said bearing, pressure exerting means mounted on said portion of said journal and rotatable with said journal, first and second flexible conduit means stationarily mounted in oppositely disposed relation to each other adjacent the path of rotation of said journal, said pressure exerting means being adjustably movable on said journal whereby to selectively engage only one of the respective first and second conduit means in a given direction of rotation of said journal, whereby to pump fluid lubricant therethrough to said bearing assembly, each of said first and second conduit means including an inlet in communication with a source of fluid lubricant and a discharge outlet positioned contiguous said journal bearing assembly, wherbey compressive engagement of said pressure exerting means with said conduit provides a pumping action which pumps fluid lubricant through said conduit to said bearing assembly.

4. The combination defined in claim 1 in which said journal is supported by a bearing on the under surface thereof and is open on an upper surface thereof, and fluid lubricant is dispensed from said conduit onto said upper surface, whereby the lubricant is carried to the contacting surfaces of said journal and said bearing.

5. The combination defined in claim 1 including a receptacle for receiving fluid lubricant dispensed from said conduit, means for supporting said receptacle above said bearing assembly, and outlet means in said receptacle whereby fluid lubricant therein may pass to said bearing assembly.

6. The combination defined in claim 1 in which a check valve is provided in said flexible conduit to prevent reverse flow therethrough.

7. The combination defined in claim 1 in which a pressure relief valve is provided in said flexible conduit.

8. A lubrication apparatus for a journal bearing assembly of the type having a journal with a hollow passage therethrough and open at the axially outer end of said hollow passage, comprising a pressure exerting means mounted on and rotatable with a portion of the journal which is in axially spaced relation to the bearing for the journal, said pressure exerting means extending radially outward from the outer periphery of said portion of the journal, a flexible conduit stationarily mounted adjacent the path of rotation of said pressure exerting means, said flexible conduit being so positioned that said pressure exerting means during its rotation compressively engages said conduit, a reservoir for fluid lubricant positioned beneath said journal bearing assembly, said conduit including an inlet in communication with said reservoir and a discharge outlet positioned contiguous the journal bearing assembly, whereby compressive engagement of said pressure exerting means with said conduit provides a pumping action which pumps fluid lubricant through said conduit to said bearing assembly.

9. The combination defined in claim 8 in which said pressure exerting means is a roller.

References Cited

UNITED STATES PATENTS

| 832,877 | 10/1906 | Richards | 308—127 |
|---|---|---|---|
| 1,748,972 | 3/1930 | Buckwalter | 308—127 X |
| 2,610,095 | 9/1952 | Browning | 308—84 |
| 2,676,069 | 4/1954 | Couch | 308—84 |
| 2,696,173 | 12/1954 | Jensen | 103—149 |
| 2,736,620 | 2/1956 | Brier | 308—84 |
| 2,869,940 | 1/1959 | Verch | 308—127 |
| 2,988,001 | 6/1961 | D'Arcey et al. | 103—149 X |
| 3,190,321 | 5/1965 | Robinson | 103—149 X |

MARTIN P. SCHWADRON, *Primary Examiner.*

L. L. JOHNSON, *Assistant Examiner.*

U.S. Cl. X.R.

308—127, 133; 103—149; 184—27